US012801899B2

(12) United States Patent
Bhardwaj et al.

(10) Patent No.: US 12,801,899 B2
(45) Date of Patent: Nov. 17, 2026

(54) MULTI-RESOLUTION FIELD REPRESENTATIONS IN NEURAL NETWORKS

(71) Applicant: QUALCOMM Incorporated, San Diego, CA (US)

(72) Inventors: Kartikeya Bhardwaj, San Diego, CA (US); Piero Zappi, La Jolla, CA (US); Paul Nicholas Whatmough, Cambridge, MA (US); Christopher Lott, San Diego, CA (US); Viswanath Ganapathy, Dublin, CA (US); Chirag Sureshbhai Patel, San Diego, CA (US); Joseph Binamira Soriaga, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 565 days.

(21) Appl. No.: 18/468,203

(22) Filed: Sep. 15, 2023

(65) Prior Publication Data

US 2025/0094780 A1 Mar. 20, 2025

(51) Int. Cl.
*G06N 3/0464* (2023.01)

(52) U.S. Cl.
CPC .................................. *G06N 3/0464* (2023.01)

(58) Field of Classification Search
CPC ............................. G06N 3/0464; G06N 3/045
See application file for complete search history.

(56) References Cited

U.S. PATENT DOCUMENTS

| | | | | |
|---|---|---|---|---|
| 2018/0068198 | A1 | 3/2018 | Savvides et al. | |
| 2020/0074271 | A1 | 3/2020 | Liang et al. | |
| 2020/0394500 | A1* | 12/2020 | Hill | G06N 3/063 |
| 2020/0410352 | A1* | 12/2020 | Buckler | G06N 3/063 |

(Continued)

FOREIGN PATENT DOCUMENTS

WO 2022269415 A1 12/2022

OTHER PUBLICATIONS

Ding X., et al., "RepVGG: Making VGG-Style ConvNets Great Again", 2021 IEEE/CVF Conference on Computer Vision and Pattern Recognition (CVPR), IEEE, Jun. 20, 2021, pp. 13728-13737, XP034009023, Section 3.3, figure 4.

(Continued)

*Primary Examiner* — Michael H Hoang
(74) *Attorney, Agent, or Firm* — Patterson + Sheridan, L.L.P.

(57) ABSTRACT

Certain aspects provide techniques and apparatuses for efficiently processing inputs in a neural network using multiple receptive field sizes. An example method includes partitioning a first input into a first set of channels and a second set of channels. At a first layer of a neural network, the first set of channels and the second set of channels are convolved into a first output having a smaller dimensionality a dimensionality of the first input. The first set of channels and the first output are concatenated into a second input. The second input is convolved into a second output via a second layer of the neural network, wherein the second output merges a first receptive field generated by the first layer with a larger second receptive field generated by the second layer. One or more actions are taken based on at least one of the first output and the second output.

30 Claims, 8 Drawing Sheets

(56) References Cited

U.S. PATENT DOCUMENTS

| | | | | |
|---|---|---|---|---|
| 2021/0089889 | A1 | 3/2021 | Gope et al. | |
| 2021/0357730 | A1 | 11/2021 | Han et al. | |
| 2023/0385642 | A1* | 11/2023 | Zhou | G06N 3/08 |

OTHER PUBLICATIONS

He K., et al., "Deep Residual Learning for Image Recognition", 2016 IEEE Conference on Computer Vision and Pattern Recognition (CVPR), IEEE, Jun. 27, 2016, 12 Pages, XP033021254, arXiv:1512.03385v1 [cs.CV] Dec. 10, 2015.

Larsson G., et al., "Fractalnet: Ultra-deep Neural Networks without Residuals", ICLR 2017, May 26, 2017, pp. 1-11.

Mehta D., et al., "Simple and Efficient Architectures for Semantic Segmentation", Jun. 16, 2022, Efficient Deep Learning for Computer Vision Workshop at CVPR 2022, 9 Pages.

Wang C-Y., et al., "CSPNET: A New Backbone that Can Enhance Learning Capability of CNN", Nov. 27, 2019, pp. 1-14.

Chen J., et al., "Multi-Scale Pedestrian Detection Algorithm Based on YOLOv3", IEEE 3rd International Conference on Power, Electronics and Computer Applications (ICPECA), Jan. 29, 2023, pp. 928-931, XP034319239, p. 1-p. 3.

Cheng X., et al., "Triple Attention Mixed Link Network for Single Image Super Resolution", arxiv.org, Cornell University Library, 201 Olin Library Cornell University Ithaca, NY 14853, Oct. 8, 2018, XP081058478, 8 Pages, p. 1-p. 3.

International Search Report and Written Opinion—PCT/US2024/039629—ISA/EPO—Nov. 15, 2024.

* cited by examiner

MULTI-RESOLUTION FIELD REPRESENTATIONS IN NEURAL NETWORKS

INTRODUCTION

Aspects of the present disclosure relate to neural networks, and more specifically to multi-resolution receptive fields in neural networks.

Neural networks, such as convolutional neural networks, are used for various tasks, such as object detection in visual content, segmentation of visual content, processing data having objects with different dimensions (e.g., spatially and/or temporally), and the like. In order to perform these tasks, these neural networks may be trained to recognize objects at different resolutions (e.g., different spatial and/or temporal resolutions). For example, in analyzing visual content, objects located at different distances from a reference plane (e.g., the surface of an imaging device that captured the visual content) may have different sizes in the captured visual content due to the differing distances of these objects from the reference plane, even though these objects may be the same size in real life.

Because similar objects may have different resolutions in data provided as an input into a neural network, neural networks are generally trained to analyze input data at different resolutions. Small resolution layers may be used, for example, to recognize small objects in close proximity to the reference plane or to recognize larger objects that are located further from the reference plane. Meanwhile, larger resolution layers may be used to recognize larger objects in close proximity to the reference plane or even larger objects that are located further from the reference plane. In doing so, data may be shared across different layers of a neural network, which may create various bottlenecks (e.g., due to memory access patterns) that increase the amount of time in which a neural network performs a task.

BRIEF SUMMARY

Certain aspects of the present disclosure provide a method for efficiently processing inputs using multiple field resolutions in a neural network. An example method generally includes partitioning a first input into a first set of channels and a second set of channels. At a first layer of a neural network, the first set of channels and the second set of channels are convolved into a first output having a smaller dimensionality a dimensionality of the first input. The first set of channels and the first output are concatenated into a second input for a second layer of the neural network. The second input is convolved into a second output via the second layer of the neural network, wherein the second output merges a first receptive field generated by the first layer with a second receptive field generated by the second layer, and wherein the second receptive field covers a larger receptive field in the first input than the first receptive field. One or more actions are taken based on at least one of the first output and the second output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict only certain aspects of this disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
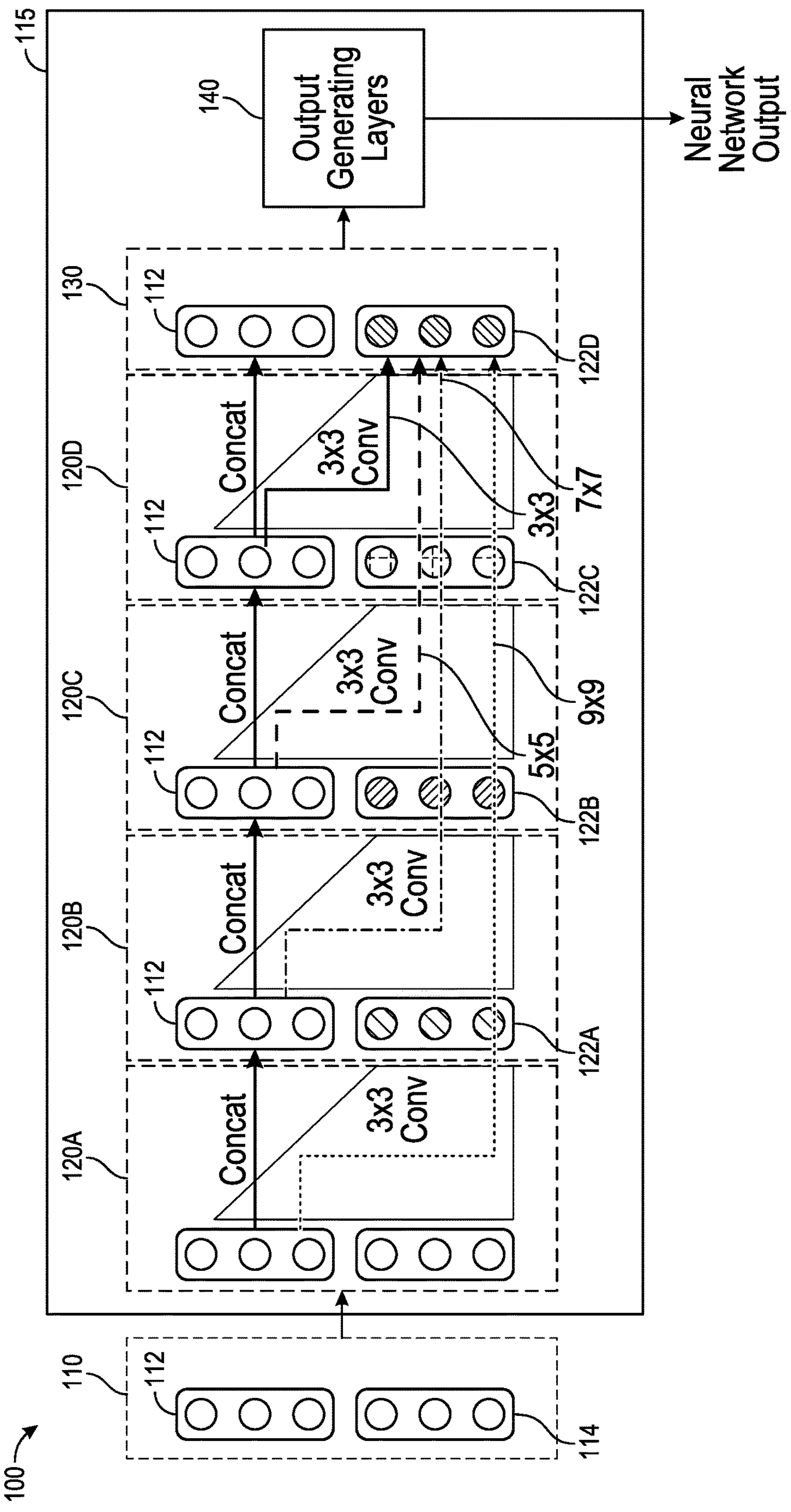
FIG. 1 illustrates an example pipeline for efficiently processing inputs in a neural network using multiple receptive field sizes, according to aspects of the present disclosure.

Aspects of the present disclosure provide apparatus, methods, processing systems, and computer-readable mediums for efficiently processing inputs using a neural network with multiple receptive field sizes.

In various scenarios, such as in in autonomous driving tasks, robotics tasks, and the like, neural networks can be used to analyze input data to identify objects of interest within an operating environment and determine actions to perform to avoid, or at least minimize the likelihood of, interaction with these identified objects. Neural networks may be used, for example, to perform semantic segmentation, in which visual content is segmented into different classes of objects (some of which may be objects of interest and others of which may be irrelevant to a given task), object detection (e.g., identifying specific instances of an object in visual content), movement prediction, and the like, and the resulting output of these neural networks may be used to determine actions to perform in order to avoid, or at least minimize the likelihood of, interaction with identified objects. Objects in visual content may not have uniform sizes in captured visual content provided as an input into a neural network. For example, a semi-truck and a passenger car located the same distance from a reference point (e.g., a camera capturing the visual content) are both vehicles and should be classified as such (assuming that a finer classification scheme is not used in the neural network) despite the size disparity between these two objects. In another example, a vehicle located closer to a reference point may appear larger in the visual content than the same vehicle located further away from the reference point; however, a neural network should be able to identify both of these vehicles in visual content despite their apparently varying sizes.

To accommodate for the varying sizes of similar objects in input data, neural networks are generally trained to identify objects using differently sized receptive fields over which data is analyzed. To support different receptive fields, different layers of a neural network may be configured to process differently sized portions of the input data. For example, a first layer may support feature map generation using a 3×3 receptive field; a second layer may support feature map generation using a 5×5 receptive field; a third layer may support feature map generation using a 7×7 receptive field, and the like. Receptive fields with smaller sizes may be used in detecting small objects or objects far away from a reference point, but may not be useful in detecting objects that are significantly larger than the size of the receptive field. Meanwhile, receptive fields with larger sizes may be used in detecting large objects or objects that are close to a reference point, but may not be able to successfully detect objects that are significantly smaller than the size of the receptive field due to the presence of other extraneous information in the receptive field.

In order to generate an output of the neural network, each of these feature maps may be provided to other portions of the neural network. The provision of these feature maps to other portions of the neural network may include various long-range skip connections that pass feature maps across layers in the neural network. For example, in a feedforward network, each layer in the encoder portion of the feedforward network may use a skip connection to bypass all subsequent feature map generation layers and provide the generated feature maps to a decoder portion of the feedforward network. Similar skip-connections can also be used in other types of convolutional networks (e.g., U-nets including a contracting path for encoding data into feature maps at different receptive field sizes and an expanding path for combining and expanding these feature maps; feature pyramid networks in which an input is upsized or downsized at successive layers in the network; etc.) in order to process inputs using differently sized receptive fields.

While skip connections allow for a neural network to effectively perform operations over different receptive field sizes, skip connections generally introduce various computational and memory bottlenecks into neural networks. For example, because of the number of parameters (e.g., weights and biases) in a neural network and the size of inputs provided into the neural network, processing an input over different receptive field sizes generally introduces various latencies into processing operations. These latencies may occur, for example, due to memory thrashing, in which data is repeatedly swapped between on-processor memory and off-processor memory. Generally, while data involved in any particular operation is being swapped into on-processor memory (e.g., cache, memory registers, etc.), the processor may be unable to perform various operations until the information involved in that particular operation is swapped into on-processor memory. In situations where the amount of on-processor memory is insufficient to hold the parameters and feature maps involved in an operation, the processor may repeatedly swap the parameters and feature maps into and out of on-processor memory, with each swap imposing hardware latency costs in the system.

Aspects of the present disclosure provide computationally efficient techniques for processing input data using different resolutions in a neural network. As discussed in further detail below, to efficiently process input data using different resolutions in a neural network, feature-map-generating layers in a neural network can generate an output which can be concatenated with a portion of an initial feature map for the input into the neural network. Deeper layers in the neural network (e.g., layers closer to a layer that uses the generated feature maps in order to perform some task with respect to the input data) may effectively have smaller receptive field sizes, with each preceding layer having feature maps with successively larger receptive field sizes. Further, the feature maps generated by deeper layers in the neural network may incorporate information from feature maps generated by preceding layers in the neural network; thus, the final feature map generated by a neural network may include information for receptive fields of multiple sizes.

Because the final feature map includes information for receptive fields of multiple sizes, aspects of the present disclosure generally provide for efficient generation of feature maps based on which objects of varying sizes in an input can be processed and may eliminate, or at least reduce, the computational expense involved in using skip connections to provide independent feature maps of varying receptive field sizes to various layers (e.g., decoders) in the neural network that extract information from these feature maps. As skip connections are eliminated, or the number of skip connections in a neural network are at least reduced, aspects of the present disclosure may thus reduce latencies involved in processing an input data using a neural network (and thus accelerate the process of generating usable results from an input), reduce power utilization from repeatedly swapping data into and out of on-processor memory (and thus correspondingly increase battery life on battery-powered devices on which neural networks are deployed), and the like.

Example Pipeline for Efficient Processing of Inputs in a Neural Network Using Multiple Receptive Field Sizes FIG. 1 illustrates an example neural network pipeline 100 for efficiently processing inputs in a neural network 115 using multiple receptive field sizes, according to aspects of the present disclosure.

As illustrated, the neural network pipeline 100 begins with generating an input feature map 110 for an input into the neural network 115. The input feature map 110 may be generated using various techniques that extract raw features from an input of any size. In some aspects, the input may be visual content, and the output may be a plurality of channels corresponding to various types of data in the input. For example, in visual content, the features may include information such as edges detected in the visual content (e.g., points at which content transitions from one object to another object), angles associated with these edges, information derived from luminance and/or chrominance data in the visual content, and the like. In some aspects, the input feature map 110 may be generated by convolving the input in order to generate these channels.

Layers 120A through 120D (which may be collectively referred to as layers 120) in the neural network pipeline 100 generally correspond to different layers in the neural network 115. While FIG. 1 illustrates the use of four layers in the neural network pipeline 100 for generating feature maps (or other outputs) which can be used to perform various tasks with respect to an input into the neural network 115, it should be recognized that the neural network pipeline 100 may include any number of layers 120. The number of layers 120 may be based, for example, on a number of differently sized receptive fields that are usable in processing an input (e.g., detecting differently sized objects in visual content). Each of the layers 120A through 120D is configured to effectively generate an output over a differently sized receptive field, which can be combined with outputs generated by successive layers 120 to generate an output that includes data from differently sized receptive fields.

To generate a first output 122A from the layer 120A, the input feature map 110 to be provided as input into the neural network 115 may be split into at least a first portion 112 and a second portion 114. In some aspects, the first portion 112 and the second portion 114 may be equal-sized portions of the input feature map 110. In other aspects, the first portion 112 and the second portion 114 may have different sizes. In such a case, the size of the first portion 112 and the second portion 114 may be set based on various metrics, such as inference accuracy, hardware performance, and the like. While FIG. 1 illustrates the partitioning of the input feature map 110 into two portions for processing, it should be recognized that the input feature map 110 may be partitioned into any number of portions for processing.

To generate the first output 122A, the layer 120A performs a convolution operation on the first portion 112 and the second portion 114. That is, to generate the first output 122A, the layer 120A performs a convolution over the input channels included in the input feature map 110. The convolution operation may result in an output that is smaller than the input feature map 110. For example, the size of the first output 122A may be half that of the input feature map 110. The first output 122A, at this stage, may reflect a convolution of the input feature map 110 over a base receptive field size (e.g., as illustrated, over a 3×3 sized receptive field).

At the layer 120B, the first portion 112 of the input feature map 110 may be concatenated with the first output 122A to generate an input which can be convolved into a second output 122B. The combination of the first portion 112 of the input feature map 110 and the first output 122A may result in an input that is the same size (e.g., has the same number of channels) as the input feature map 110 and incorporates receptive field data from the layer 120A. As illustrated, the resulting second output 122B may, like the first output 122A, have a size that is half that of the input feature map 110. After execution of convolution operations in the layer 120B, the second output 122B may include data over two receptive field sizes: the base receptive field size and a first larger receptive field size (e.g., a 3×3 base receptive field size and a larger 5×5 receptive field size resulting from the combination of two 3×3 receptive fields).

Similarly, at the layer 120C, the first portion 112 of the input feature map 110 may be concatenated with the second output 122B to generate an input which can be convolved into a third output 122C. The resulting third output 122C, as illustrated, may also have a size that is half that of the input feature map 110. After execution of convolution operations in the layer 120C, the third output 122C may include data over three receptive field sizes: the base receptive field size, a first larger receptive field size, and a second larger receptive field size that is larger than the size of the first larger receptive field (e.g., a 3×3 base receptive field size and two larger receptive field sizes of 5×5 and 7×7).

At the layer 120D, which, as illustrated in the example of FIG. 1, is the final convolutional layer, the first portion 112 of the input feature map 110 may be concatenated with the third output 122C to generate a fourth output 122D. The fourth output 122D may serve as a portion of an output feature map 130. The fourth output 122D, like the outputs 122A, 122B, and 122C discussed herein, may have a size (in this example) that is half that of the size of the input feature map 110. After execution of convolution operations in the layer 120D, the fourth output 122D may include data over four receptive field sizes: the base receptive field size, a first larger receptive field size, a second larger receptive field size that is larger than the size of the first larger receptive field, and a third larger receptive field size that is larger than the size of the second larger receptive field (e.g., a 3×3 base receptive field size and three larger receptive field sizes of 5×5, 7×7, and 9×9).

The output feature map 130 may be generated by concatenating the first portion 112 of the input feature map 110 with the fourth output 122D. The output feature map 130 can be used by other portions of the neural network 115 or other neural networks (not shown in FIG. 1) to perform various tasks with respect to the input represented by the input feature map 110. Because the fourth output 122D includes information from a plurality of differently sized receptive fields, layers in a neural network (e.g., the neural network 115 shown in FIG. 1 or other neural networks) that process the output feature map 130 (e.g., in order to semantically segment visual content, detect objects in visual content, etc.) such as the output generating layers 140, can perform operations with respect to varying sizes of objects in the input. Further, because aspects of the present disclosure eliminate, or at least reduce, the number of skip connections implemented in a neural network, such processing may be computationally efficient and may reduce the likelihood that latencies due to memory thrashing are experienced while the neural network pipeline 100 processes the input.

For example, a convolution operation at a first layer of a neural network which processes an input of size H×W×C, where H represents a height dimension, W represents a width dimension, and C represents a channel dimension, may use a number of parameters equivalent to $3\times3\times C\times C=9C^2$ and may include a number of multiply-and-accumulate operations equivalent to $9HWC^2$ to generate an output having the same dimensions as the input. The resulting memory utilization for the parameters of the first layer of the neural network may be proportional to $9C^2$. The resulting memory utilization for the activations generated by the first layer of the neural network may be proportional to 2HWC. At a second layer of the neural network, in which the input is added to the output of the first layer of the neural network, the same number of parameters may be used, and the same number of multiply-and-accumulate operations may be performed as in the first layer of the neural network. The resulting memory utilization for the parameters of the second layer of the neural network may be proportional to $9C^2$. The resulting memory utilization for the activations generated by the second layer of the neural network may be proportional to 3HWC.

In contrast, aspects of the present disclosure may reduce the memory utilization and the number of multiply-and-accumulate operations performed within a neural network due to the re-use of portions of an input feature map. For example, the number of parameters used in a layer in the neural network pipeline 100 may be equivalent to $$\frac{9C^2}{2},$$

and the number or multiply-and-accumulate operations executed within a layer in the neural network pipeline 100 may be equivalent to $$\frac{9HWC^2}{2}.$$

The resulting memory utilization for the parameters of a layer in the neural network pipeline 100 may be proportional to $$\frac{9C^2}{2},$$

and the resulting memory utilization for activations generated by the layer in the neural network pipeline 100 may be proportional to $$HWC + \frac{HWC}{2} = 1.5HWC.$$

In other words, aspects of the present disclosure may use half the parameters, multiply-and-accumulate operations, and parameter memory, relative to a convolutional layer that generates an output that is the sum of an input feature map and a generated convolutional output of the same size. Further, aspects of the present disclosure may use three-quarters of the activation map memory, relative to a convolutional layer that generates an output that is the sum of an input feature map and a generated convolutional output of the same size.

It should be recognized that while FIG. 1 illustrates each layer 120A-D in the neural network pipeline 100 as utilizing the same split between data copied from the input feature map and the output of a preceding layer in the neural network pipeline 100, each layer may independently select the amount of data to re-use from the input feature map and the amount of data to use from a generated output from a previous layer in the neural network pipeline 100. Per-layer adjustments to the amount of data re-used (e.g., duplicated, copied, referenced, etc.) from the input feature map and the amount of data used from the output of a prior layer in the neural network pipeline 100 may be based on various metrics, such as the accuracy of the neural network, hardware utilization metrics, and the like.

Figure 2:
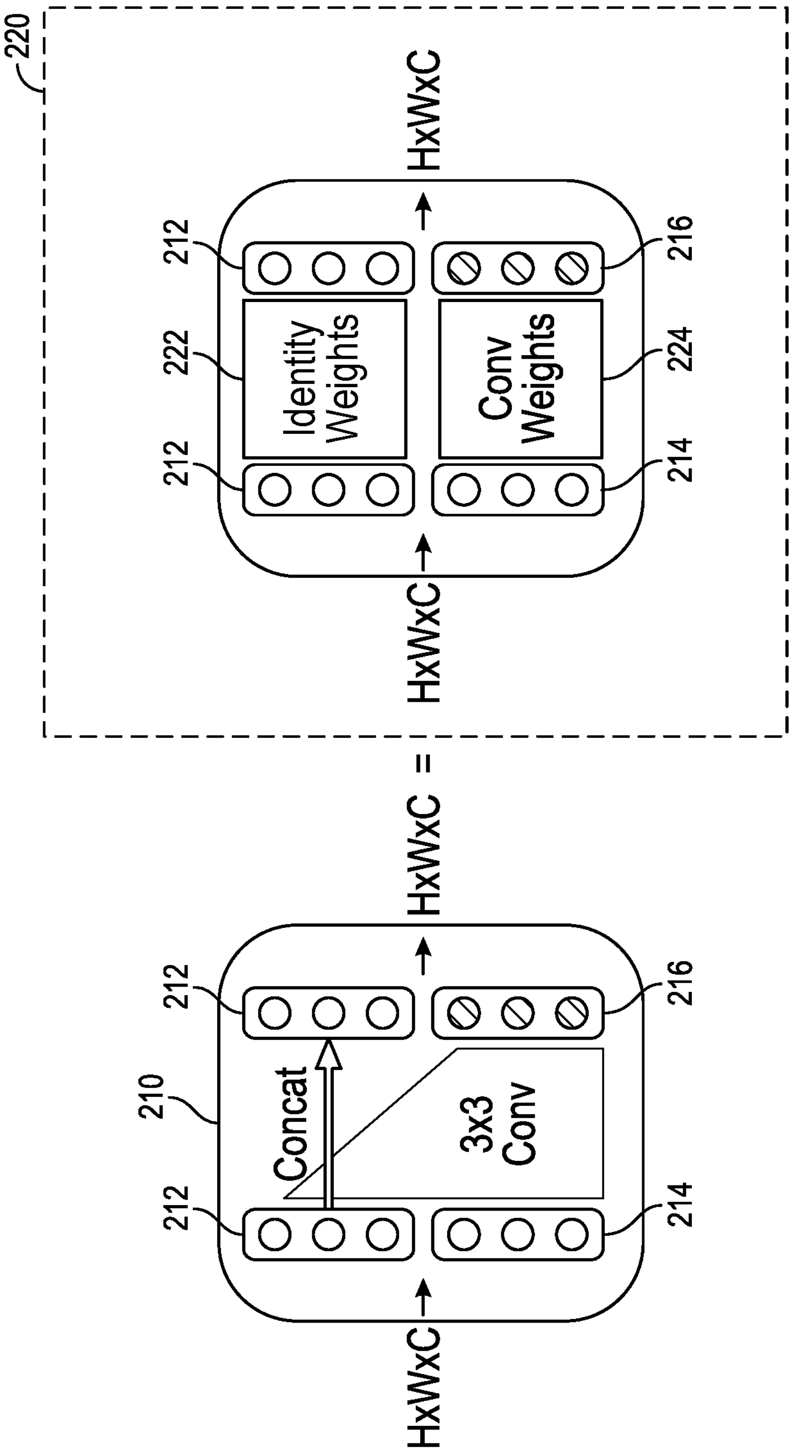
FIG. 2 illustrates an example layer in a neural network for processing inputs in the neural network using multiple receptive field sizes, according to aspects of the present disclosure.

FIG. 2 illustrates example layer architectures 210, 220 in a neural network (e.g., neural network 115 illustrated in FIG. 1) for processing inputs in the neural network using multiple receptive field sizes, according to aspects of the present disclosure.

In the layer architecture 210, an input of dimensions H×W×C may be split into a first portion 212 and a second portion 214. To generate the output of the layer architecture 210, the first portion 212 and the second portion 214 may be convolved into a convolutional result 216. As discussed, the size of the convolutional result 216 may be smaller than the size of the input (e.g., the combination of the first portion 212 and second portion 214); for example, the size of the convolutional result 216 may be half the size of the input. To generate a full output that can be used as an input to a subsequent layer of a neural network (e.g., to increase the size of a receptive field or to decode information from the input based on multiple receptive fields embedded in the convolutional result 216), the first portion 212 may be copied and concatenated with the convolutional result 216. The resulting combination of the first portion 212 and the convolutional result 216 may have dimensions of H×W×C and may be provided as an input to a subsequent layer of the neural network.

In some aspects, to effectuate the generation of an output including multiple receptive fields, the layer architecture 220 may include a set of identity weights 222 and a set of convolutional weights 224. The identity weights 222 may be used to transfer (e.g., copy, duplicate, etc.) the first portion 212 of the input to a corresponding portion of an output of the layer architecture 220. Meanwhile, the convolutional weights 224 may be used to convolve the first portion 212 and second portion 214 of the input into the convolutional result 216. Similar to the layer architecture 210, the size of the convolutional result 216 may be smaller than the size of the input (e.g., the combination of the first portion 212 and second portion 214). The output, which may be the combination of the first portion 212 and the convolutional result 216, may have the same size as the input (e.g., for an input with dimensions H×W×C, the output may have the same dimensions of H×W×C). In using identity weights in the layer architecture 220, aspects of the present disclosure may skip computation and parameter movement for the portion of the input that is concatenated with the output, which may reduce the amount of power consumed in generating an output of a layer in a neural network for a given input.

Example Depth-First Processing of Inputs in a Neural Network Using Multiple Receptive Field Sizes FIGS. 3A-3D illustrate in-memory operations 300A-300D performed for depth-first processing of inputs in a neural network (e.g., neural network 115 illustrated in FIG. 1) using multiple receptive field sizes, according to aspects of the present disclosure. The in-memory operations 300A-300D may be performed, for example, by a layer in a neural network, such as a layer structured according to the layer architecture 210 or layer architecture 220 illustrated in FIG. 2.

As illustrated in FIGS. 3A through 3D, an input 310 may be divided into a plurality of input features 310A-310D (amongst others, not illustrated in FIGS. 3A through 3D). A first output 320 may similarly be divided into a plurality of output features 320A-320D (amongst others, not illustrated in FIGS. 3A through 3D). In the example illustrated herein, the input 310 may be divided into a first portion and a second portion. The first portion may include the input features 310A and 310B, which may be concatenated with a convolutional result generated by a layer of a neural network for the input 310. The second portion may include the input features 310C and 310D. Likewise, the first output 320 may be divided into a first portion and a second portion. The first portion of the first output 320 may include the output features 320A and 320B which may have an identity relationship with the input features 310A and 310B, respectively. The second portion of the first output 320 may include the output features 320C and 320D. The second portion of the first output 320 may include, as discussed in further detail herein, features generated by convolving the input 310 based on a defined receptive field size for a layer of the neural network. The size of the first portion and second portion of the input 310 may be fixed across layers in the neural network or may vary for different layers of the neural network.

Figure 3A:
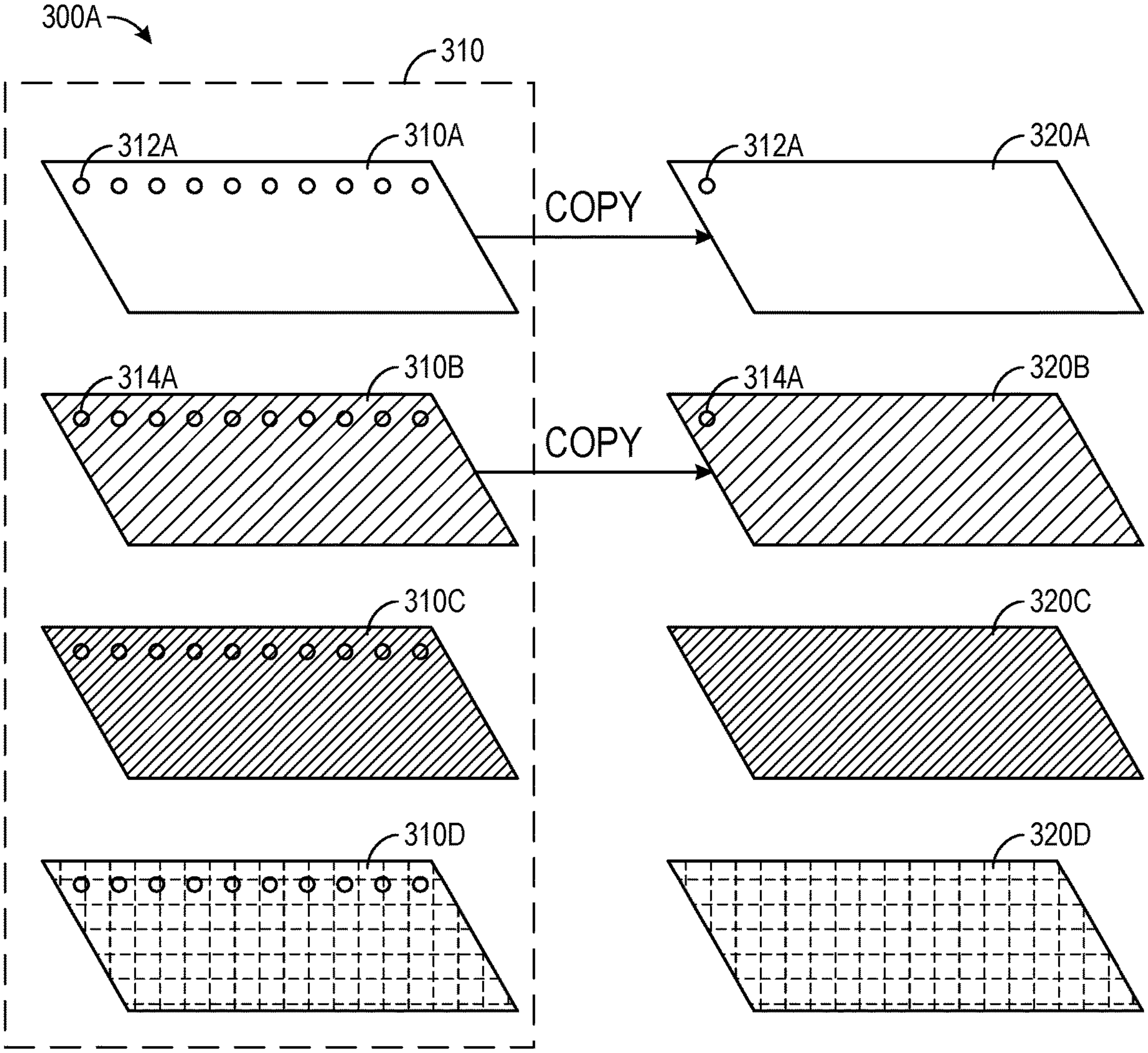
FIGS. 3A, 3B, 3C, and 3D illustrate in-memory operations performed for depth-first processing of inputs in a neural network using multiple receptive field sizes, according to aspects of the present disclosure.

FIG. 3A illustrates operations 300A performed with respect to a portion of the input 310 that remains the same in the first output 320 generated by performing convolutions on the input 310. In this example, elements 312A and 314A in input segments may be copied from the input features 310A and 310B to the output features 320A and 320B, respectively. In some aspects, the copying may be performed using identity weights in a layer of a neural network such that the input equals the output. In some aspects, to reduce memory utilization and operations involved in copying and writing data to memory, the elements 312A and 314A may be duplicated in the output features 320A and 320B by writing a reference (also known as a pointer) to the location at which the elements 312A and 314A are stored in memory (e.g., a memory address).

Figure 3B:
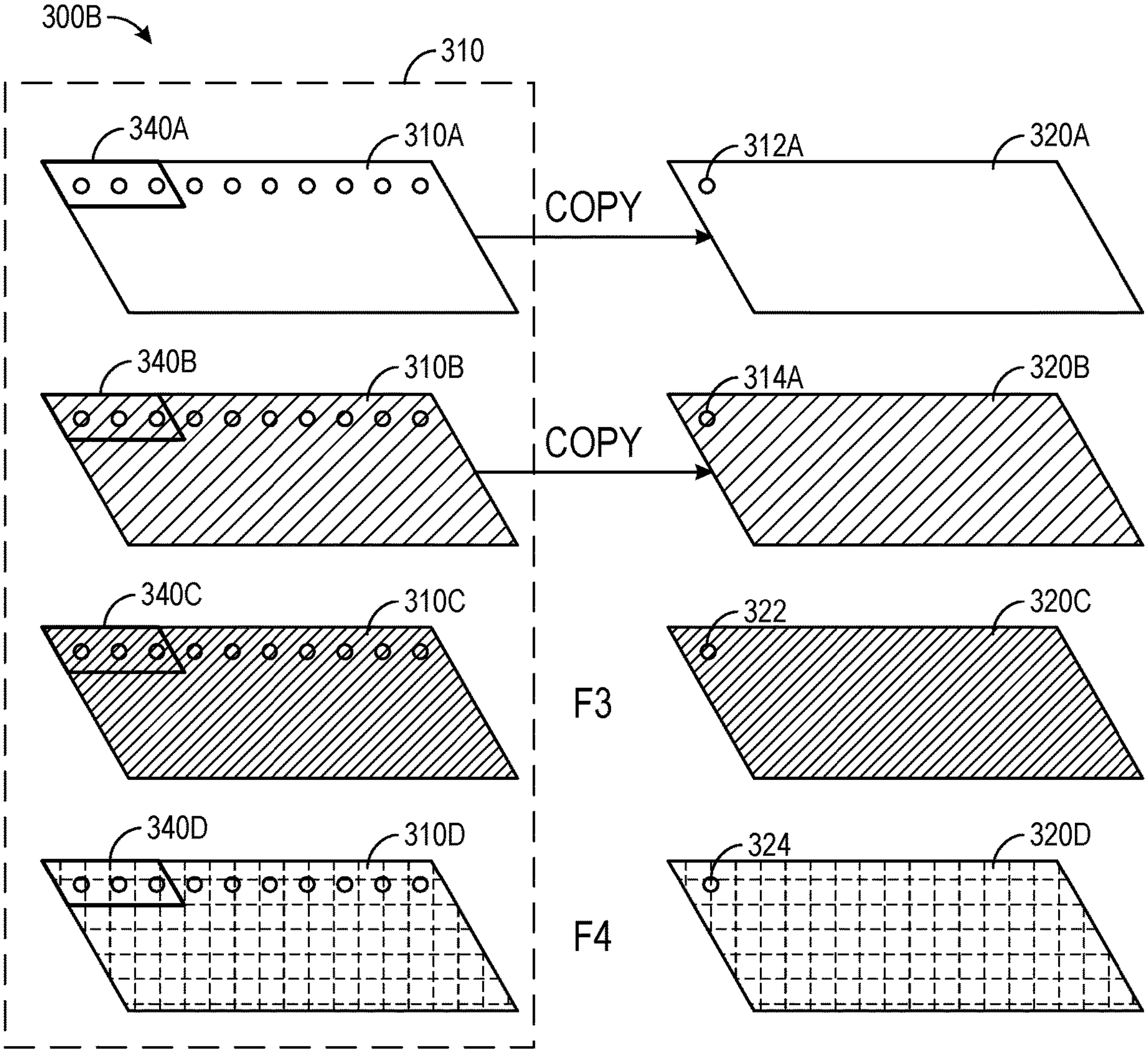

FIG. 3B illustrates operations 300B performed with respect to the input 310 (e.g., convolution operations) to generate elements 322 and 324 at the first index of the second portion of the first output 320. To generate elements 322 and 324 in the output features 320C and 320D, respectively, convolution operations F3 and F4, respectively, may be performed based on input block 340A from the input feature 310A, input block 340B from the input feature 310B, input block 340C from the input feature 310C, and input block 340D from the input feature 310D. The size of each of the input blocks 340A through 340D may be defined based on a size of a convolutional kernel used to process the input 310 in order to generate the first output 320. The size of the convolutional kernel may be consistent across different layers of the neural network, such that convolving an output generated using a prior layer of the neural network results in the generation of an output including multiple receptive field sizes. As discussed, the size of receptive fields included in an output generated by a layer of a neural network may include a base size generated by the layer of the neural network and successively larger receptive field sizes based on a number of preceding layers in the neural network.

Figure 3C:
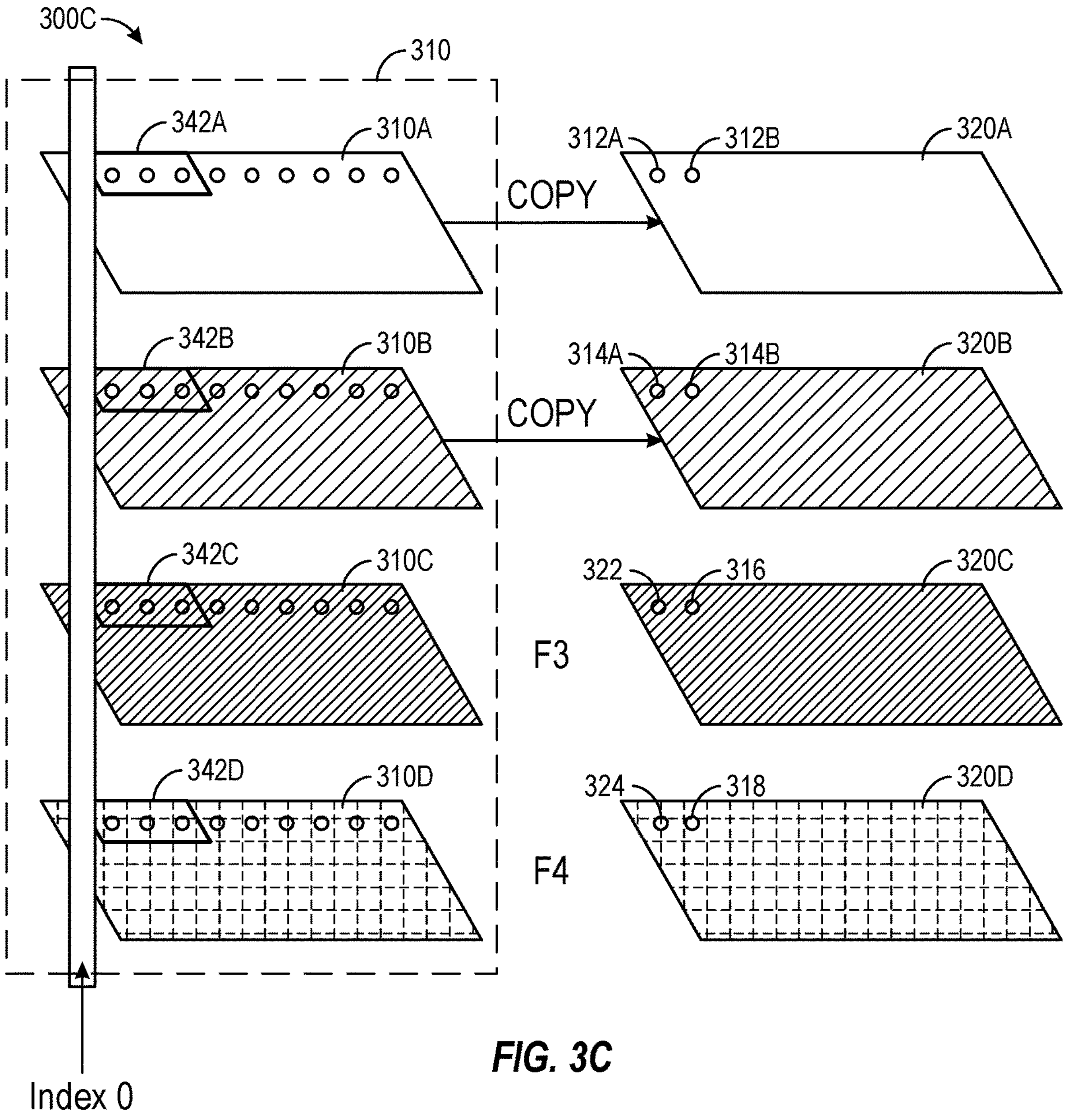

FIG. 3C illustrates operations 300C performed with respect to the input 310 to generate elements in the second index of the first output 320. The elements located at index 0 of the input features 310A through 310D may be discarded, as such elements are no longer involved in further convolutions performed within the neural network because the window of data over which these further convolutions are performed has shifted such that the data at index 0 is outside of the window. The elements 312B and 314B from the input features 310A and 310B may be respectively copied to the output features 320A and 320B, similar to how the elements 312A and 314A are copied to the output features 320A and 320B described above with respect to the operations 300A illustrated in FIG. 3A. The elements 316 and 318 may be generated by convolving the input blocks 342A through 342D in the input 310. The operations 300C may be performed until a sufficient number of elements are generated in the first output 320 such that convolution operations may be performed with respect to the first output 320 by another layer in the neural network.

Figure 3D:
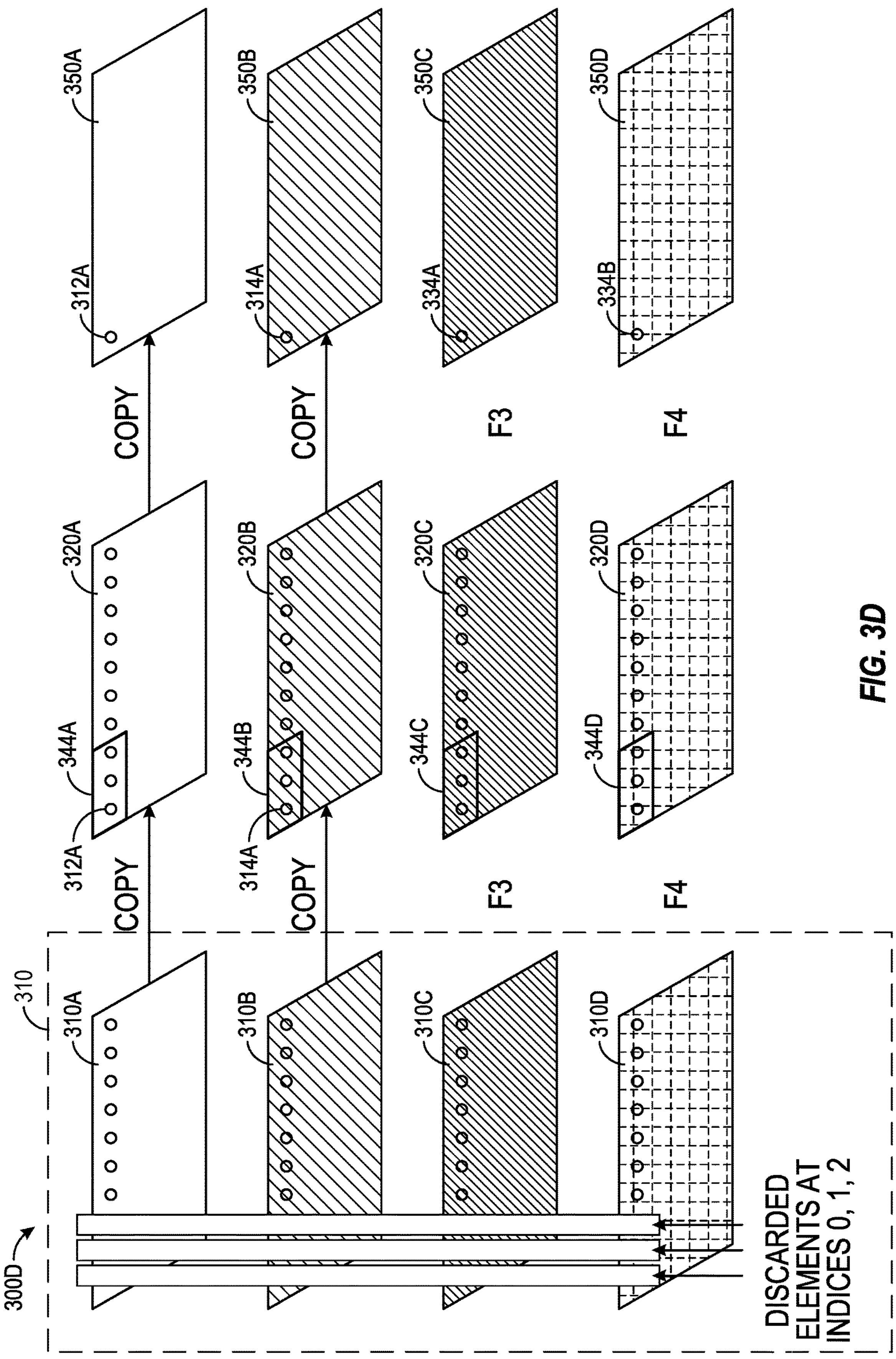

FIG. 3D illustrates operations 300D performed with respect to the first output 320 generated by a first layer of a neural network to generate elements at a first index in a second output 350 generated by a second layer of the neural network. As illustrated, similar to the duplication of the elements 312A and 314A illustrated in the operations 300A, the operations 300D may leverage the identity relationship between the input into the second layer of the neural network (e.g., the output of the first layer of the neural network provided as input into the second layer of the neural network) and the output of the second layer of the neural network to respectively copy the elements 312A and 314A from the first output features 320A and 320B into the output features 350A and 350B, respectively. Similar to the operations 300B, the first output blocks 344A through 344D may be convolved to generate the elements 334A and 334B in the outputs 350C and 350D, respectively. Subsequent operations may be performed using depth-first techniques that seek to execute as many operations as possible at deeper layers in the neural network before executing operations at shallower layers in the neural network.

Figure 4:
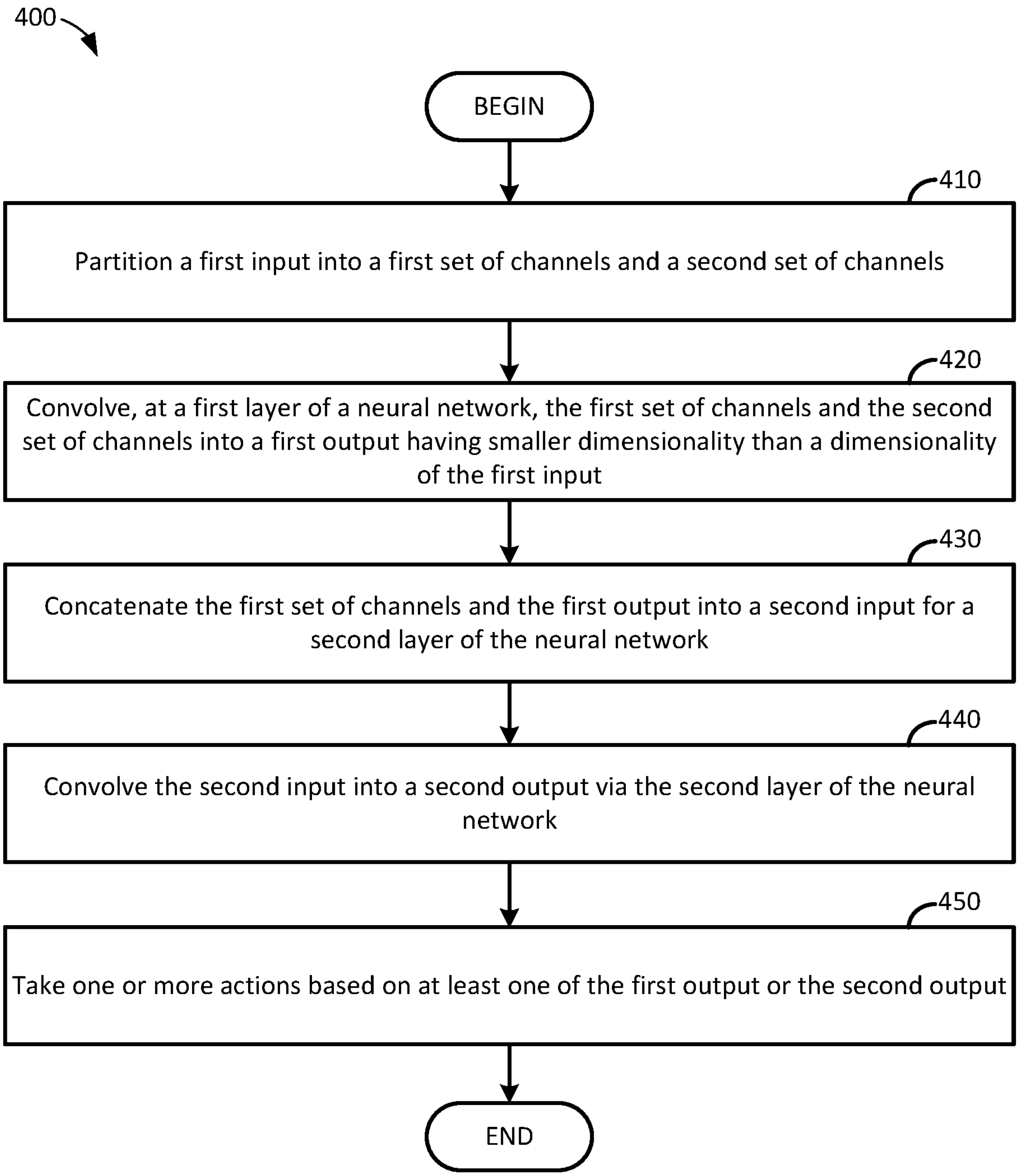
FIG. 4 illustrates example operations for efficiently processing inputs in a neural network using multiple receptive field sizes, according to aspects of the present disclosure.

Example Operations for Efficient Processing of Inputs in a Neural Network Using Multiple Receptive Field Sizes FIG. 4 illustrates example operations 400 for processing inputs in a neural network (e.g., the neural network 115 illustrated in FIG. 1) using multiple receptive field sizes, according to aspects of the present disclosure. The operations 400 may be performed, for example, by a processing system (e.g., the processing system 500 illustrated in FIG. 5) on which a neural network is deployed for use in generating inferences on various types of input data. These processing systems may include, for example, smartphones, autonomous vehicles, computing devices communicatively coupled with robots, and so on.

As illustrated, the operations 400 begin at block 410, with partitioning a first input (e.g., the input feature map 110 illustrated in FIG. 1) into (at least) a first set of channels (e.g., the first portion 112 of the input feature map 110 illustrated in FIG. 1) and a second set of channels (e.g., the second portion 114 of the input feature map 110 illustrated in FIG. 1).

In some aspects, the first set of channels and the second set of channels comprise equal-sized contiguous portions of the first input. In some aspects, partitioning the first input may include partitioning the first input such that the first set of channels has a different number of channels from the second set of channels.

In some aspects, the first set of channels and the second set of channels may comprise different-sized contiguous portions of the first input. The sizes of the first set of channels and the second set of channels may be determined, as discussed above, based on various metrics, such as, and without limitation, inference accuracy, hardware performance, or the like.

At block 420, the operations 400 proceed with convolving, at a first layer of a neural network, the first set of channels and the second set of channels into a first output (e.g., any of outputs 122A through 122D illustrated in FIG. 1) having smaller dimensionality than a dimensionality of the first input.

In some aspects, the first output has a size corresponding to a size of the first set of channels. In some aspects, the first output has a size of the second set of channels.

At block 430, the operations 400 proceed with concatenating the first set of channels and the first output into a second input (e.g., the concatenation of the first portion 112 of the input feature map 110 and any of outputs 122A through 122D illustrated in FIG. 1) for a second layer of the neural network.

In some aspects, concatenating the first set of channels and the first output into the second input includes concatenating a reference to the first set of channels and the first output. The reference may be, for example, a memory pointer that references a location in memory at which the first set of channels is located.

In some aspects, the second input may be generated by discarding at least a portion of the first input. This discarded portion of the first input may be determined based at least in part on portions of the first input used in convolving the second input into the second output. In some aspects, the portion of the first input is discarded further based on portions of the first input used in performing one or more additional convolutions for layers of the neural network deeper than the second layer of the neural network.

At block 440, the operations 400 proceed with convolving the second input into a second output (e.g., any of outputs 122B through 122D illustrated in FIG. 1) via the second layer of the neural network. Generally, the second output merges a first receptive field embodied in the output generated by the first layer of the neural network with a second receptive field embodied in the output generated by the second layer of the neural network. The first receptive field may cover a larger receptive field in the first input than the second receptive field.

In some aspects, the second output has a size corresponding to (e.g., equal to) a size of the first set of channels. In some aspects, the second output has a size of the second set of channels.

In some aspects, convolving the second input into the second output includes processing the first set of channels based on identity weights between an input and an output of the second layer of the neural network (e.g., as illustrated in FIG. 2 and discussed above). The second input may further be processed based on convolutional weights defined in the second layer of the neural network.

At block 450, the operations 400 proceed with taking one or more actions based on at least one of the first output and the second output. The one or more actions may include, for example and without limitation, semantic segmentation of visual content into a plurality of segments, each segment being associated with a different class of object; object detection in visual content; movement prediction for objects detected in visual content, and/or other actions which may be performed based on processing objects at varying receptive field sizes in an input.

In some aspects, further downstream actions may be taken, or at least initiated, based on the one or more actions taken based on at least one of the first output and the second output. For example, based on detecting objects within a field of travel, one or more control signals may be generated to control the motion of an autonomous vehicle, a robotic arm, or the like, in order to minimize, or at least reduce, the likelihood that the autonomous vehicle, robotic arm, etc. will collide with the detected objects. In another example, based on predicting that an object will travel in a particular direction relative to an autonomous vehicle, robotic arm, or the like, one or more control signals may be generated to cause the autonomous vehicle, robotic arm, etc. to change a direction of motion and/or the speed at which such motion is performed in order to in order to minimize, or at least reduce, the likelihood that the autonomous vehicle, robotic arm, etc. will move in conflict with the object for which future motion is predicted.

In yet another example, based on semantic segmentation of an image into classes of objects that are of interest and classes of objects that can be ignored (e.g., foreground content and background content, or moving content and static content), image data can be compressed using varying compression schemes with varying degrees of compression loss (e.g., such that foreground content or moving content is compressed using lossless or near-lossless compression schemes, while background content or static content is compressed using lossier compression schemes). It should be noted that the foregoing are but examples of additional actions that can be performed based on at least one of the first output and the second output, and other actions may be contemplated based on the environment in which a neural network is deployed.

In some aspects, the operations 400 may further include concatenating the first set of channels and the second output into a third input (e.g., a combination of the first portion 112 of the input feature map 110 and any of outputs 122B through 122D illustrated in FIG. 1) for a third layer of the neural network. The third input may be convolved into a third output (e.g., any of outputs 122C or 122D illustrated in FIG. 1) via the third layer of the neural network. Generally, the third output merges a first receptive field generated by the first layer of the neural network, a second receptive field generated by the second layer of the neural network, and a third receptive field generated by the third layer of the neural network. The third receptive field may cover a smaller receptive field in the first input than the first receptive field and the second receptive field. The one or more actions may be taken based further in part on the third output.

It should be understood that the operations 400 discussed above are applicable to neural networks with any number of layers and are not limited to neural networks with two layers as described with respect to FIG. 4.

Figure 5:
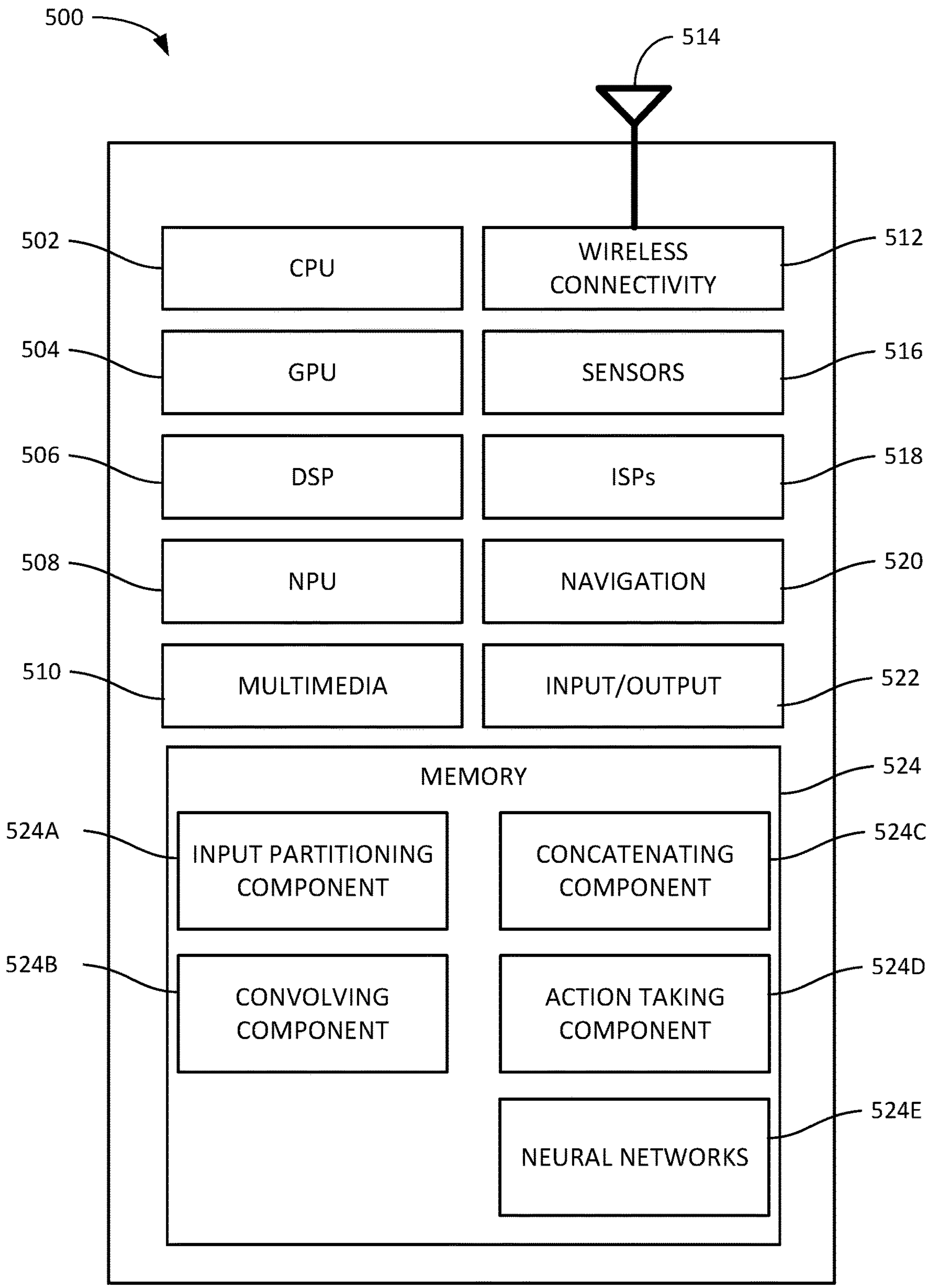
FIG. 5 depicts an example processing system configured to perform various aspects of the present disclosure.

Example Processing Systems for Efficient Processing of Inputs in a Neural Network Using Multiple Receptive Field Sizes FIG. 5 depicts an example processing system 500 for efficient processing of inputs in a neural network using multiple receptive field sizes, such as described herein for example with respect to FIG. 4.

The processing system 500 includes at least one central processing unit (CPU) 502, which in some examples may be a multi-core CPU. Instructions executed at the CPU 502 may be loaded, for example, from a program memory associated with the CPU 502 or may be loaded from a memory partition (e.g., of memory 524).

The processing system 500 also includes additional processing components tailored to specific functions, such as a graphics processing unit (GPU) 504, a digital signal processor (DSP) 506, a neural processing unit (NPU) 508, a multimedia processing unit 510, and a connectivity component 512.

An NPU, such as the NPU 508, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples such NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new piece through an already trained model to generate a model output (e.g., an inference).

In some implementations, the NPU 508 is a part of one or more of the CPU 502, the GPU 504, and/or the DSP 506. These may be located on a user equipment (UE) in a wireless communication system or another computing device.

In some examples, the connectivity component 512 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The connectivity component 512 may be further coupled to one or more antennas 514.

The processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS) as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes a memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

In particular, in this example, the memory 524 includes an input partitioning component 524A, a convolving component 524B, a concatenating component 524C, an action taking component 524D, and neural networks 524E. The depicted components, and others not depicted, may be configured to perform various aspects of the methods described herein.

Generally, the processing system 500 and/or components thereof may be configured to perform the methods described herein.

Example Clauses

Implementation details of various aspects of the present disclosure are set forth in the following numbered clauses:

Clause 1: A processor-implemented method, comprising: partitioning a first input into a first set of channels and a second set of channels; convolving, at a first layer of a neural network, the first set of channels and the second set of channels into a first output having a smaller dimensionality than a dimensionality of the first input; concatenating the first set of channels and the first output into a second input for a second layer of the neural network; convolving the second input into a second output via the second layer of the neural network, wherein: the second output merges a first receptive field generated by the first layer of the neural network with a second receptive field generated by the second layer of the neural network, and the first receptive field covers a larger receptive field in the first input than the second receptive field; and taking one or more actions based on at least one of the first output and the second output.

Clause 2: The method of Clause 1, wherein the first set of channels and the second set of channels comprise equal-sized contiguous portions of the first input.

Clause 3: The method of Clause 1 or 2, wherein the first output has a size corresponding to a size of the first set of channels or a size of the second set of channels.

Clause 4: The method of any of Clauses 1 through 3, wherein the second output has a size corresponding to a size of the first set of channels or a size of the second set of channels.

Clause 5: The method of any of Clauses 1 through 4, wherein concatenating the first set of channels and the first output into the second input comprises concatenating a reference to the first set of channels and the first output.

Clause 6: The method of any of Clauses 1 through 5, further comprising discarding at least a portion of the first input based at least in part on portions of the first input used in convolving the second input into the second output.

Clause 7: The method of Clause 6, wherein the at least the portion of the first input is discarded further based on portions of the first input used in performing one or more additional convolutions for layers of the neural network deeper than the second layer of the neural network.

Clause 8: The method of any of Clauses 1 through 7, wherein partitioning the first input comprises unevenly partitioning the first input such that the first set of channels has a different number of channels as the second set of channels.

Clause 9: The method of any of Clauses 1 through 8, wherein convolving the second input into a second output via the second layer of the neural network comprises processing the first set of channels based on identity weights between an input and an output of the second layer of the neural network and processing the second input based on convolutional weights defined in the second layer of the neural network.

Clause 10: The method of any of Clauses 1 through 9, further comprising: concatenating the first set of channels and the second output into a third input for a third layer of the neural network; and convolving the third input into a third output via the third layer of the neural network, wherein: the third output merges a first receptive field generated by the first layer of the neural network, a second receptive field generated by the second layer of the neural network, and a third receptive field generated by the third layer of the neural network, and the third receptive field covers a smaller receptive field in the first input than the first receptive field and the second receptive field; wherein the one or more actions are taken further based, at least in part, on the third output.

Clause 11: A processing system, comprising: a memory having executable instructions stored thereon; and one or more processors configured to execute the executable instructions in order to cause the processing system to perform the operations of any of Clauses 1 through 10.

Clause 12: A system comprising means for performing the operations of any of Clauses 1 through 10.

Clause 13: A computer-readable medium having executable instructions stored thereon which, when executed by one or more processors, cause the one or more processors to perform the operations of any of Clauses 1 through 10.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising:

at least one memory having executable instructions stored thereon; and one or more processors communicatively coupled with the at least one memory and configured to execute the executable instructions in order to cause the processing system to:

partition a first input into a first set of channels and a second set of channels;

convolve, at a first layer of a neural network, the first set of channels and the second set of channels into a first output having a smaller dimensionality than a dimensionality of the first input;

concatenate the first set of channels and the first output into a second input for a second layer of the neural network;

convolve the second input into a second output via the second layer of the neural network, wherein:

the second output merges a first receptive field generated by the first layer of the neural network with a second receptive field generated by the second layer of the neural network, and the first receptive field covers a larger receptive field in the first input than the second receptive field; and take one or more actions based on at least one of the first output and the second output.

2. The processing system of claim 1, wherein the first set of channels and the second set of channels comprise equal-sized contiguous portions of the first input.

3. The processing system of claim 1, wherein the first output has a size corresponding to a size of the first set of channels or a size of the second set of channels.

4. The processing system of claim 1, wherein the second output has a size corresponding to a size of the first set of channels or a size of the second set of channels.

5. The processing system of claim 1, wherein in order to concatenate the first set of channels and the first output into the second input, the one or more processors are configured to cause the processing system to concatenate a reference to the first set of channels and the first output.

6. The processing system of claim 1, wherein the one or more processors are further configured to cause the processing system to discard at least a portion of the first input based at least in part on portions of the first input used in convolving the second input into the second output.

7. The processing system of claim 6, wherein the at least the portion of the first input is discarded further based on portions of the first input used in performing one or more additional convolutions for layers of the neural network deeper than the second layer of the neural network.

8. The processing system of claim 1, wherein to partition the first input, the one or more processors are configured to cause the processing system to partition the first input such that the first set of channels has a different number of channels than the second set of channels.

9. The processing system of claim 1, wherein to convolve the second input into a second output via the second layer of the neural network, the one or more processors are configured to cause the processing system to process the first set of channels based on identity weights between an input and an output of the second layer of the neural network and to process the second input based on convolutional weights defined in the second layer of the neural network.

10. The processing system of claim 1, wherein the one or more processors are further configured to cause the processing system to:

concatenate the first set of channels and the second output into a third input for a third layer of the neural network; and convolve the third input into a third output via the third layer of the neural network, wherein:

the third output merges a first receptive field generated by the first layer of the neural network, a second receptive field generated by the second layer of the neural network, and a third receptive field generated by the third layer of the neural network; and the third receptive field covers a smaller receptive field in the first input than the first receptive field and the second receptive field; and the one or more actions are taken further based, at least in part, on the third output.

11. A processor-implemented method, comprising:

partitioning a first input into a first set of channels and a second set of channels;

convolving, at a first layer of a neural network, the first set of channels and the second set of channels into a first output having a smaller dimensionality than a dimensionality of the first input;

concatenating the first set of channels and the first output into a second input for a second layer of the neural network;

convolving the second input into a second output via the second layer of the neural network, wherein:

the second output merges a first receptive field generated by the first layer of the neural network with a second receptive field generated by the second layer of the neural network, and the first receptive field covers a larger receptive field in the first input than the second receptive field; and taking one or more actions based on at least one of the first output and the second output.

12. The method of claim 11, wherein the first set of channels and the second set of channels comprise equal-sized contiguous portions of the first input.

13. The method of claim 11, wherein the first output has a size corresponding to a size of the first set of channels or a size of the second set of channels.

14. The method of claim 11, wherein the second output has a size corresponding to a size of the first set of channels or a size of the second set of channels.

15. The method of claim 11, wherein concatenating the first set of channels and the first output into the second input comprises concatenating a reference to the first set of channels and the first output.

16. The method of claim 11, further comprising discarding at least a portion of the first input based at least in part on portions of the first input used in convolving the second input into the second output.

17. The method of claim 16, wherein the at least the portion of the first input is discarded further based on portions of the first input used in performing one or more additional convolutions for layers of the neural network deeper than the second layer of the neural network.

18. The method of claim 11, wherein partitioning the first input comprises unevenly partitioning the first input such that the first set of channels has a different number of channels than the second set of channels.

19. The method of claim 11, wherein convolving the second input into a second output via the second layer of the neural network comprises processing the first set of channels based on identity weights between an input and an output of the second layer of the neural network and processing the second input based on convolutional weights defined in the second layer of the neural network.

20. The method of claim 11, further comprising:

concatenating the first set of channels and the second output into a third input for a third layer of the neural network; and convolving the third input into a third output via the third layer of the neural network, wherein:

the third output merges a first receptive field generated by the first layer of the neural network, a second receptive field generated by the second layer of the neural network, and a third receptive field generated by the third layer of the neural network;

the third receptive field covers a smaller receptive field in the first input than the first receptive field and the second receptive field; and the one or more actions are taken further based, at least in part, on the third output.

21. A system, comprising:

means for partitioning a first input into a first set of channels and a second set of channels;

means for convolving, at a first layer of a neural network, the first set of channels and the second set of channels into a first output having a smaller dimensionality than a dimensionality of the first input;

means for concatenating the first set of channels and the first output into a second input for a second layer of the neural network;

means for convolving the second input into a second output via the second layer of the neural network, wherein:

the second output merges a first receptive field generated by the first layer of the neural network with a second receptive field generated by the second layer of the neural network, and the first receptive field covers a larger receptive field in the first input than the second receptive field; and means for taking one or more actions based on at least one of the first output and the second output.

22. The system of claim 21, wherein the first set of channels and the second set of channels comprise equal-sized contiguous portions of the first input.

23. The system of claim 21, wherein the first output has a size corresponding to a size of the first set of channels or a size of the second set of channels.

24. The system of claim 21, wherein the second output has a size corresponding to a size of the first set of channels or a size of the second set of channels.

25. The system of claim 21, wherein the means for concatenating the first set of channels and the first output into the second input comprises means for concatenating a reference to the first set of channels and the first output.

26. The system of claim 21, further comprising means for discarding at least a portion of the first input based at least in part on portions of the first input used in convolving the second input into the second output.

27. The system of claim 26, wherein the means for discarding are configured to discard at least the portion of the first input based on portions of the first input used in performing one or more additional convolutions for layers of the neural network deeper than the second layer of the neural network.

28. The system of claim 21, wherein the means for partitioning the first input comprises means for unevenly partitioning the first input such that the first set of channels has a different number of channels than the second set of channels.

29. The system of claim 21, wherein the means for convolving the second input into a second output via the second layer of the neural network comprises means for processing the first set of channels based on identity weights between an input and an output of the second layer of the neural network and means for processing the second input based on convolutional weights defined in the second layer of the neural network.

30. The system of claim 21, further comprising:

means for concatenating the first set of channels and the second output into a third input for a third layer of the neural network; and means for convolving the third input into a third output via the third layer of the neural network, wherein:

the third output merges a first receptive field generated by the first layer of the neural network, a second receptive field generated by the second layer of the neural network, and a third receptive field generated by the third layer of the neural network;

the third receptive field covers a smaller receptive field in the first input than the first receptive field and the second receptive field; and the one or more actions are taken further based, at least in part, on the third output.

* * * * *